(12) United States Patent
Nagashima

(10) Patent No.: US 6,263,579 B1
(45) Date of Patent: Jul. 24, 2001

(54) HAND-HELD POWER WORKING MACHINE

(75) Inventor: Akira Nagashima, Kanagawa (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/095,865

(22) Filed: Jun. 11, 1998

(30) Foreign Application Priority Data

Jun. 25, 1997 (JP) ................................. 9-168666

(51) Int. Cl.[7] ................................. A01G 3/04
(52) U.S. Cl. ................................. 30/220; 30/216; 30/223
(58) Field of Search ............................ 30/208, 209, 210, 30/215, 216, 220, 223, 369

(56) References Cited

U.S. PATENT DOCUMENTS

| 3,802,075 | * | 4/1974 | Taylor et al. | 30/216 |
| 3,897,630 | * | 8/1975 | Glover et al. | 30/220 |
| 4,619,045 | * | 10/1986 | Mayer | 30/216 |
| 5,075,972 | * | 12/1991 | Huang | 30/216 |
| 5,271,154 | | 12/1993 | Ohkanda | 30/216 |
| 5,373,641 | | 12/1994 | Ohkanda | 30/216 |
| 5,689,887 | * | 11/1997 | Heywood et al. | 30/220 |

FOREIGN PATENT DOCUMENTS 6905   1/1994 (JP) .

OTHER PUBLICATIONS

United States Statutory Invention Registration No. H1428, by Ohkanda, Apr. 1995.*

* cited by examiner

Primary Examiner—Hwei-Siu Payer
(74) Attorney, Agent, or Firm—Baker & Botts, L.L.P.

(57) ABSTRACT

A hand-held power working machine in which the clipper blades thereof can be easily dismounted for the exchange or grinding thereof in a way that minimizes the possibility of damage to the power transmission device or the clipper blades in the course of such dismounting. Also, conventional integrated type clipper blades can be mounted thereon. The power working machine includes a working portion provided with a pair of clipper blades and a power transmission device for transmitting a reciprocating driving power to the working portion, wherein the power transmission device includes a pair of intermediate reciprocating driving plates which are couplingly interposed between a pair of reciprocating movement-guiding arms, to be driven by a driving rotor, and the pair of clipper blades.

6 Claims, 5 Drawing Sheets

HAND-HELD POWER WORKING MACHINE

BACKGROUND OF THE INVENTION

1. Field of the Invention

This invention relates to a hand-held power working machine, and in particular to a power transmission device for a working member and to the clipper blades (saw blades), which are designed to be disposed at the front portion of a power working machine such as a hedge trimmer.

2. The Prior Art

A hand-held power working machine, such as a hedge trimmer, is generally constituted by a prime mover case housing a prime mover, such as an internal combustion engine, a mount base portion supporting a transmission case housing a power transmission device, such as gears, to be actuated by the prime mover, a working portion comprising clipper blades to be actuated via the aforementioned power transmission device by the prime mover, and a handling portion attached to the prime mover case, the transmission case or the mount base portion. The handling portion is constituted, for the convenience of manipulation thereof, by a front handle portion and a rear handle portion. For the purpose of protecting an operator's hand gripping the front handle portion from accidents, a hand protector is attached to a portion in front of the front handle. The working portion comprising the clipper blades, etc. is disposed below the hand protector.

According to another type of conventional hand-held power working machine provided with a working portion comprising clipper blades, a prime mover, such as an internal combustion engine, is attached to one end portion of a long manipulating rod, and the working portion (comprising the clipper blades) is mounted, together with a transmission case, on the other end portion of the long manipulating rod. The rotating power of the prime mover is transmitted via a transmission shaft passed through the manipulating rod to the transmission case. Then, through a transmission device housed in the transmission case, the rotating power is further transmitted to the clipper blades of the working portion, thereby allowing the clipper blades to be driven reciprocatively so as to perform the cutting of lawns and other vegetation. (See, for example, Japanese Utility Model Publication H/6-905.)

FIG. 4 shows a cross-sectional view of a transmission case 50 and a working portion 60 comprising clipper blades 61 and 62 of the aforementioned hand-held power working machine. FIG. 5 shows the clipper blades 61 and 62, and a reciprocating movement-guiding arm 65 (66) for guiding the reciprocating movement of the clipper blades 61 and 62. As shown in FIG. 4, a main drive shaft 51, to be driven by the power of the prime mover (not shown), is rotatably supported in the transmission case 50. A driving rotor 52 provided with a pair of upper and lower eccentric circular cams 52a and 52b differing in phase from each other is drivably attached to the main shaft 51.

The working portion 60 is constituted by a pair of clipper blades 61 and 62 which are superimposed one upon the other. The clipper blades 61 and 62 are respectively provided not only with a plurality of cutting edges 61c and 62c formed at predetermined intervals on both sides of each blade (see FIG. 5), but also with a plurality of guiding slots 61a and 62a which are formed at predetermined intervals along the center line and in the longitudinal direction of each of the clipper blades 61 and 62.

On the upper surface of the upper clipper blade 61, there is disposed an upper blade-supporting plate 64 which is supported or cantilevered by the transmission case 50 by means of securing bolts 68 and locknuts 69. There is also disposed, on the bottom surface of the lower clipper blade 62, a lower blade-supporting plate 67, which is secured by a plurality of guiding screws 70 which are introduced from the bottom side of the lower blade-supporting plate 67 into the guiding slots 61a and 62a so as to allow the tip end portions thereof to protrude from the upper blade-supporting plate 64 and to be clamped by locknuts 71. The pair of the upper and lower clipper blades 61 and 62 are disposed in such a manner that, even in the aforementioned secured condition, they are capable of reciprocatively moving in the longitudinal direction thereof as guided by the combination of the guiding screws 70 within the guiding slots 61a and 62a. Guide collars 71a of appropriate height are positioned around the screws 70 to space the upper and lower plates 64 and 67 apart by the necessary distance.

As shown in FIG. 5, the reciprocating movement-guiding arms 65 and 66 are not only provided at the proximal end portion thereof with elliptical openings 65a and 66a, respectively, the minor axis of which is almost the same as that of the eccentric circular cams 52a and 52b, but are also provided at the distal end portion thereof with coupling members 65b and 66b each having a circular head.

The proximal end portions of the clipper blades 61 and 62 facing the aforementioned reciprocating movement-guiding arms 65 and 66 are provided with cutout engaging portions 61b and 62b, each having a shape conforming with the shape of the circular coupling members 65b and 66b. Namely, the cutout engaging portions 61b and 62b are adapted to be engaged with the coupling members 65b and 66b, while the elliptical openings 65a and 66a of the reciprocating movement-guiding arms 65 and 66 are adapted to be engaged with the eccentric circular cams 52a and 52b.

The transmission case 50, constructed as explained above, and the working portion 60, comprising the clipper blades 61 and 62, are interconnected in such a manner that when the main shaft 51 is rotated, thereby to rotate the driving rotor 52, the pair of upper and lower eccentric circular cams 52a and 52b (differing in phase from each other) are caused to rotate, thereby causing the clipper blades 61 and 62 to reciprocate, guided by the reciprocating movement-guiding arms 65 and 66, in opposite directions to each other with a phase shift of 180 degrees, thus making it possible to carry out the cutting of vegetation and the like.

According to the conventional hand-held power working machine, the reciprocating movement-guiding arms 65 and 66 are designed to be separated from the clipper blades 61 and 62 through disengagement of the circular coupling members 65b and 66b from the cutout engaging portions 61b and 62b. Accordingly, when it is desired to replace or sharpen the clipper blades 61 and 62, the clipper blades 61 and 62 can be separated from the reciprocating movement-guiding arms 65 and 66 by first unfastening and removing the locknuts 71 from the guiding male screws 70 and then dismounting the lower blade-supporting plate 67 from the upper blade-supporting plate 64.

However, since the reciprocating movement-guiding arms 65 and 66 are provided at the proximal end portions thereof with the elliptical openings 65a and 66a, respectively, to allow them to be reciprocatively driven by the driving rotor 52 (through the pair of upper and lower eccentric circular cams 52a and 52b), the reciprocating movement-guiding arms 65 and 66 are required to have a wide width in the direction perpendicular to the direction of reciprocation. Accordingly, a raw material plate of relatively large width is required for the manufacture of the reciprocating movement-guiding arms 65 and 66. At the same time, to ensure a sufficient structural strength in the region where the elliptical openings 65a and 66a are formed, the material plate must be of relatively large thickness or, alternatively, the ring portion surrounding the elliptical openings 65a and 66a must be enlarged in width. This design also involves a troublesome working during manufacture.

Further, since the reciprocating movement-guiding arms 65 and 66 are integrated with the clipper blades 61 and 62 through the engagement between the circular head coupling members 65b and 66b and the cutout engaging portions 61b and 62b and, at the same time, are reciprocatively moved while maintaining such integrated condition, a phenomenon of scoop-out tends to occur due to flexing stress in the engagement portions between the coupling members 65b and 66b and the cutout engaging portions 61b and 62b, thereby giving rise to rattling at the engagement portions therebetween.

Furthermore, the so-called integrated type clipper blades (where the reciprocating movement-guiding arms and the clipper blades are pivotally coupled with each other via a pin and which is widely employed in other types of conventional hand-held power working machine) cannot be used in the aforementioned type of hand-held power working machine where the reciprocating movement-guiding arms 65 and 66 are integrated with the clipper blades 61 and 62 through the above-described engagement. Namely, there is an inconvenience in that the clipper blades to be employed in the aforementioned type of hand-held power working machine are not interchangeable with other types of clipper blades.

SUMMARY OF THE INVENTION

This invention has been made to cope with the aforementioned problems, and therefore has an object to provide a hand-held power working machine in which the clipper blades thereof can be easily dismounted for the exchange or grinding thereof, the power transmission and clipper blades can be dismounted without risk of damage, and conventional integrated type clipper blades can also be mounted thereon.

With a view to realizing the aforementioned object, the present invention provides a power working machine which comprises a working portion provided with a pair of clipper blades and a power transmission device for transmitting a reciprocating driving power to the working portion, wherein the power transmission device comprises a pair of intermediate reciprocating driving plates that are couplingly interposed between a pair of reciprocating movement-guiding arms, to be driven by a driving rotor, and the pair of clipper blades.

In one preferred embodiment of the power transmission device of power working machine according to the invention, the pair of intermediate reciprocating driving plates and the pair of clipper blades are integrally coupled with each other, with reciprocating motion thereof being effected through an engagement between (1) a tapered coupling member that is formed on one of the intermediate reciprocating driving plates and clipper blades and (2) a cutout engaging portion that is formed in the other of the intermediate reciprocating driving plates and clipper blades and that has an inner peripheral shape conforming to an outer peripheral shape of the tapered coupling portion. The outer peripheral portion of the tapered coupling portion is preferably sagittate in shape.

According to another preferred feature of the power transmission device of a power working machine according to the invention, the pair of intermediate reciprocating driving plates and the pair of reciprocating movement-guiding arms are integrally coupled with each other through an engagement between a columnar projection formed on the pair of the intermediate reciprocating driving plates or the pair of reciprocating movement-guiding arms and a circular opening formed in the other of the pair of the intermediate reciprocating driving plates or the pair of reciprocating movement-guiding arms. The driving rotor is provided at an upper surface thereof and a lower surface thereof with eccentric circular cams, respectively, differing in phase by 180 degrees from each other. The eccentric circular cams are engaged with circular holes that are formed in the reciprocating movement-guiding arms and that have an inner diameter conforming to the outer diameter of the eccentric circular cams.

In the assembled state of the working portion (provided with the aforementioned clipper blades) to the main body of a power working machine according to the invention, the pair of intermediate reciprocating driving plates are provided with guiding slots, the working portion is provided with an upper blade-supporting plate and a lower blade-supporting plate, and the working portion is attached and clamped to the main body of power working machine by means of fixing bolts which are introduced into the guiding slots from the bottom sides thereof to extend upward, while sandwiching the pair of intermediate reciprocating driving plates and the pair of clipper blades between the upper blade-supporting plate and the lower blade-supporting plate.

According to the power working machine of the invention constructed as mentioned above, the clipper blades can be dismounted from the working machine by, first, simply disengaging the locknuts from the fixing bolts clamping the clipper blades to the main body of the working machine and, second, withdrawing the fixing bolts from the working portion. Thus, an exchange of the clipper blades can be easily performed without disassembling the main body of the working machine.

Furthermore, since a pair of intermediate reciprocating driving plates is couplingly interposed between a pair of reciprocating movement-guiding arms (to be driven by a driving rotor) and a pair of clipper blades, the reciprocating movement-guiding arms are allowed to move reciprocatively while being concurrently allowed to move laterally in accordance with the rotation of the driving rotor. This makes it possible to form the engaging portion of the driving rotor in a circular shape, thereby minimizing the width in the lateral direction of the reciprocating movement-guiding arms.

According to a further preferred feature of the invention, since the intermediate reciprocating driving plates and the clipper blades are integrally coupled with each other through an engagement between a sagittate coupling portion and a cutout engaging portion having an inner peripheral shape conforming to the outer peripheral shape of the sagittate coupling portion, it is possible to achieve a tight coupling, i.e., without looseness, so that rattling of the coupled portion can be prevented in the reciprocating motion of the intermediate reciprocating driving plates and the clipper blades.

Furthermore, since the intermediate reciprocating driving plates and the clipper blades are integrally coupled with each other to form a combined structure which is identical with the conventional clipper blades of the integral type, it is possible, if necessary, to exchange the combined driving plate-clipper blade structure according to the invention with the conventional integrated type clipper blade.

DESCRIPTION OF A PREFERRED EMBODIMENT OF THE INVENTION

Next, a hand-held power working machine representing one embodiment of the invention will be explained with reference to the drawings. It will be understood, however, that the invention should not be construed to be limited by this embodiment, but may be variously modified within the spirit and scope of the invention as defined in the appended claims.

Figure 1:
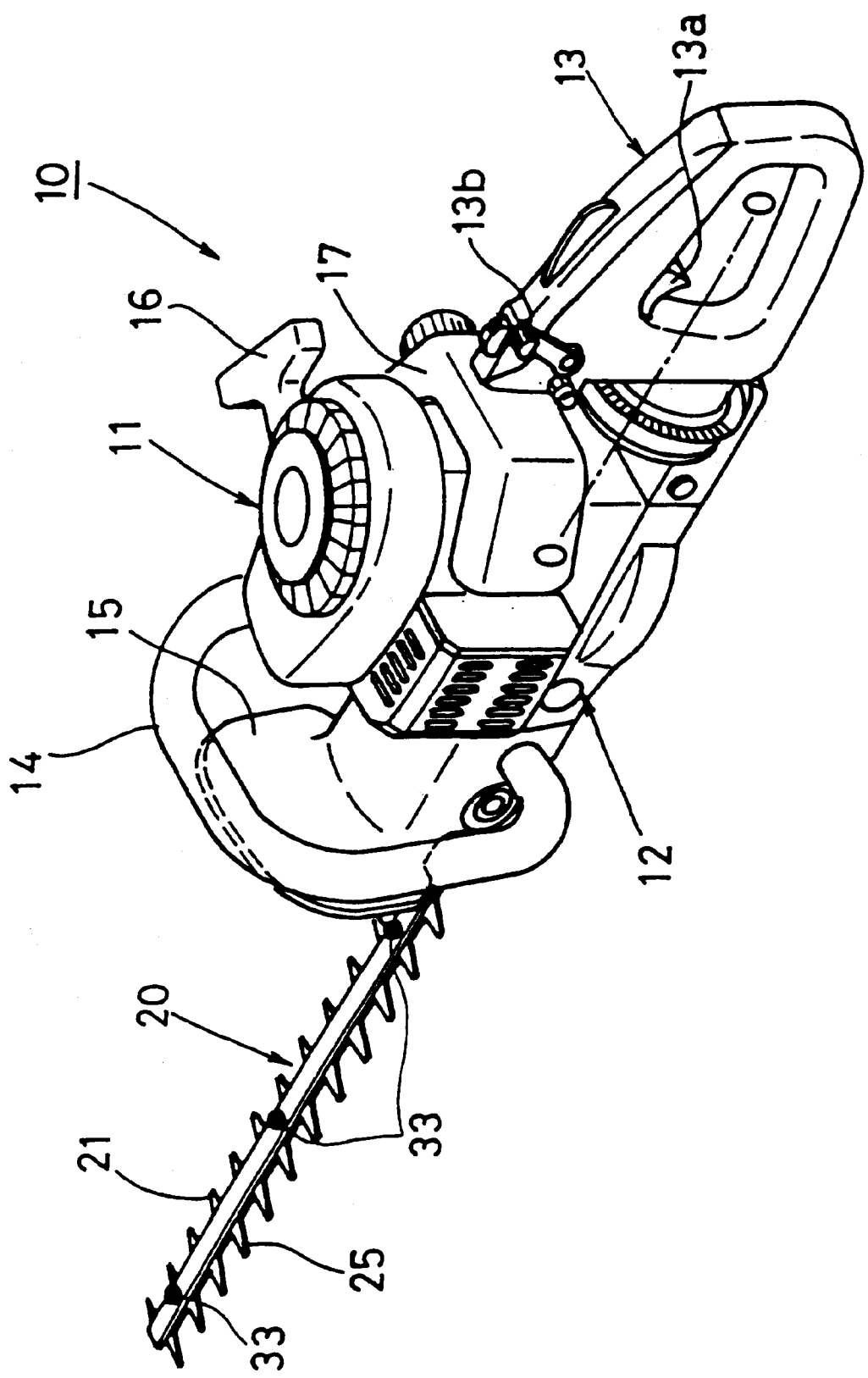
FIG. 1 is a perspective view illustrating a hedge trimmer representing one embodiment of a hand-held power working machine according to the present invention.

FIG. 1 is a perspective view illustrating one embodiment of a hedge trimmer 10 provided with a clipper blades-mounted working portion 20 according to this embodiment. The hedge trimmer 10 comprises an air-cooled two-stroke gasoline internal combustion engine 11, a mount base portion 12 enclosing a lower portion of the main body 12a (see FIG. 2) of the machine 10 which is integrally formed with a transmission case housing a power transmission device 40 (to be explained hereinafter), such as gears, to be actuated by the internal combustion engine 11. The clipper blades-mounted working portion 20 comprises a pair of upper and lower clipper blades 21 and 25 which are to be reciprocatively actuated via the aforementioned power transmission device 40 by the internal combustion engine 11. A loop-shaped front handle portion 14 is mounted on a forward portion of the mount base 12, a hand protector 15 is disposed in the vicinity of the front handle portion 14, and a rear handle portion 13 is mounted on a rearward portion of the mount base 12.

A recoil starter 16 and a fuel tank 17 are attached to the internal combustion engine 11, which conventionally includes a carburetor having a throttle valve and an ignition plug. The pair of upper and lower clipper blades 21 and 25 constituting the clipper blades-mounted working portion (or clipper blade portion) 20 are designed to be reciprocatively driven relative with one another, each moving in the longitudinal direction thereof, by means of the internal combustion engine 11 via the power transmission device 40, such as a reciprocative motion device, disposed in the main body 12a. The rear handle portion 13 is mounted on the mount base 12 in such a manner that it can be pivotally rotated about an axial line O—O, and so that it can be locked at any rotational position. A throttle lever 13a and a sub-throttle lever 13b are attached to the rear handle portion 13.

Figure 2:
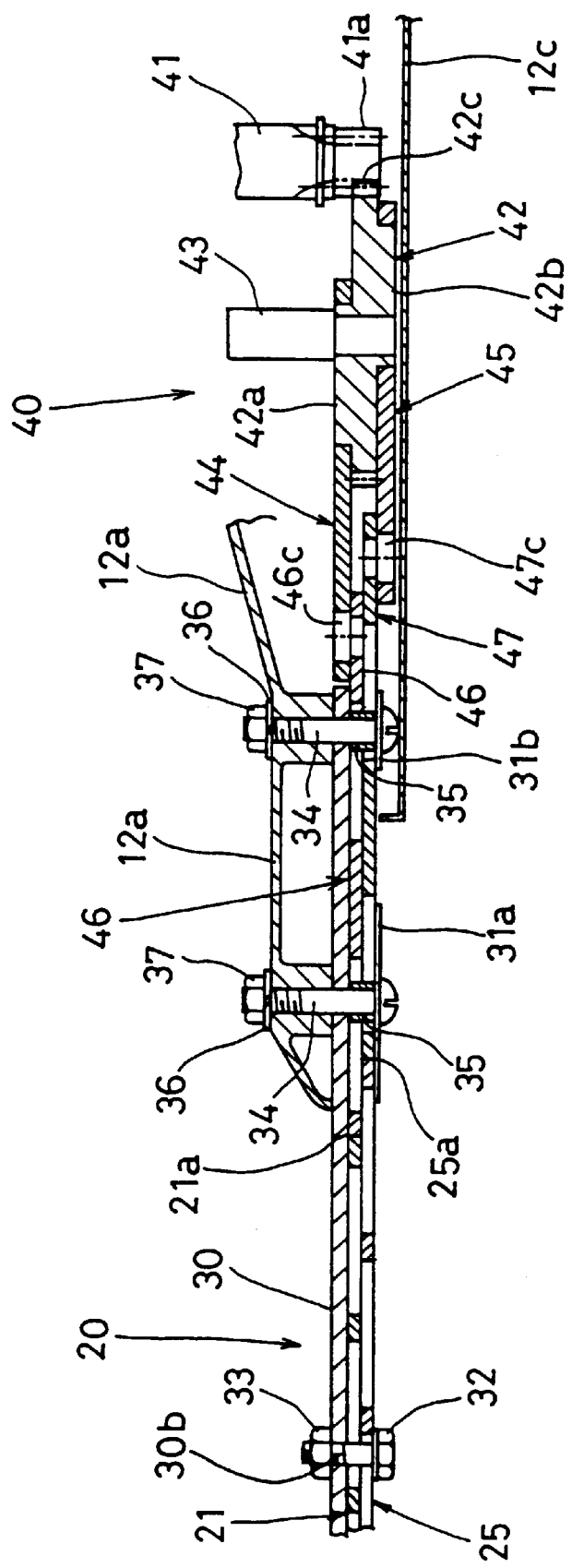
FIG. 2 is a longitudinal cross-sectional view illustrating the clipper blades-mounted working portion and the power transmission device of the hedge trimmer shown in FIG. 1.
Figure 3:
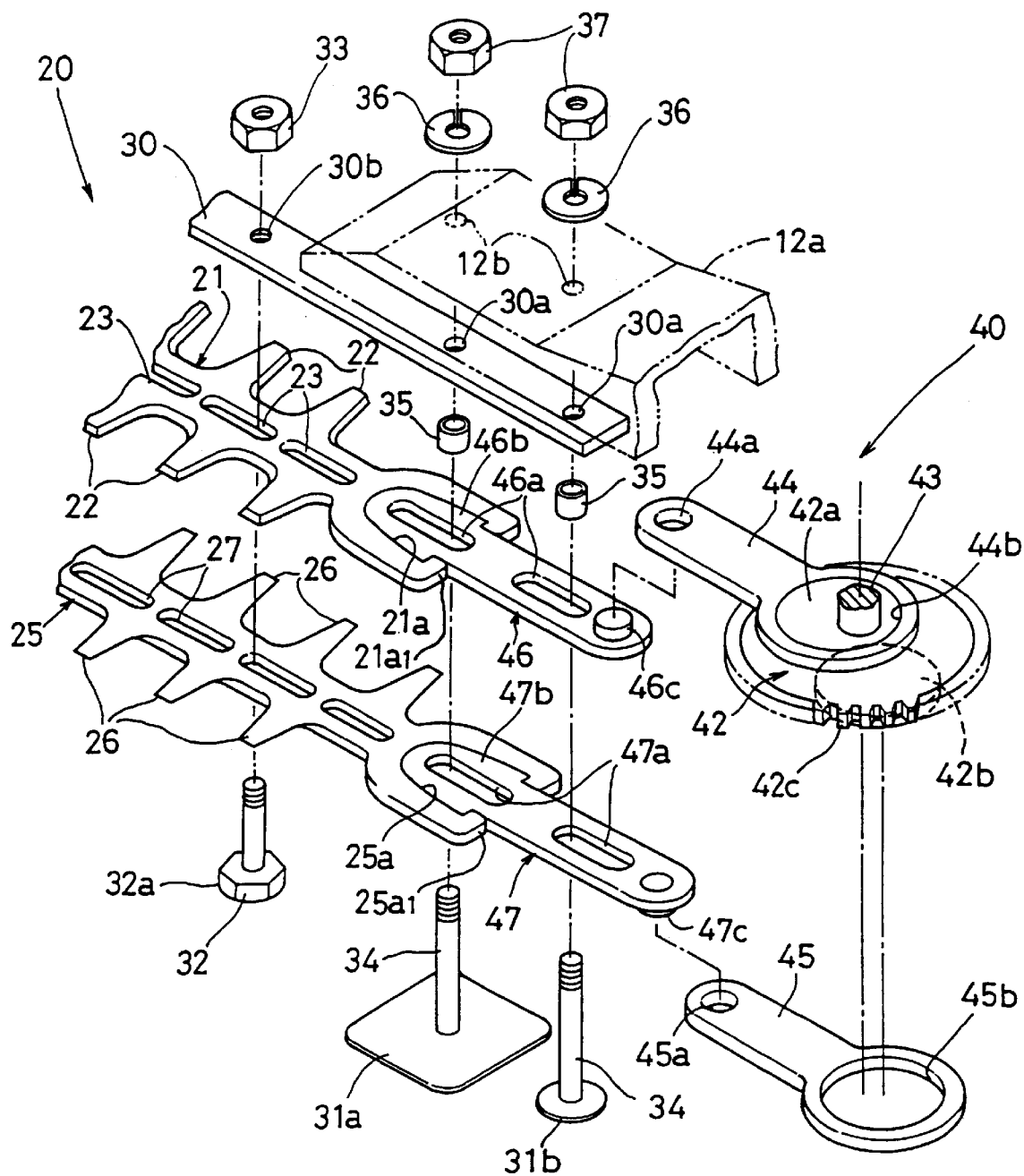
FIG. 3 is an exploded perspective view of the clipper blades-mounted working portion and the power transmission device shown in FIG. 2.
Figure 4:
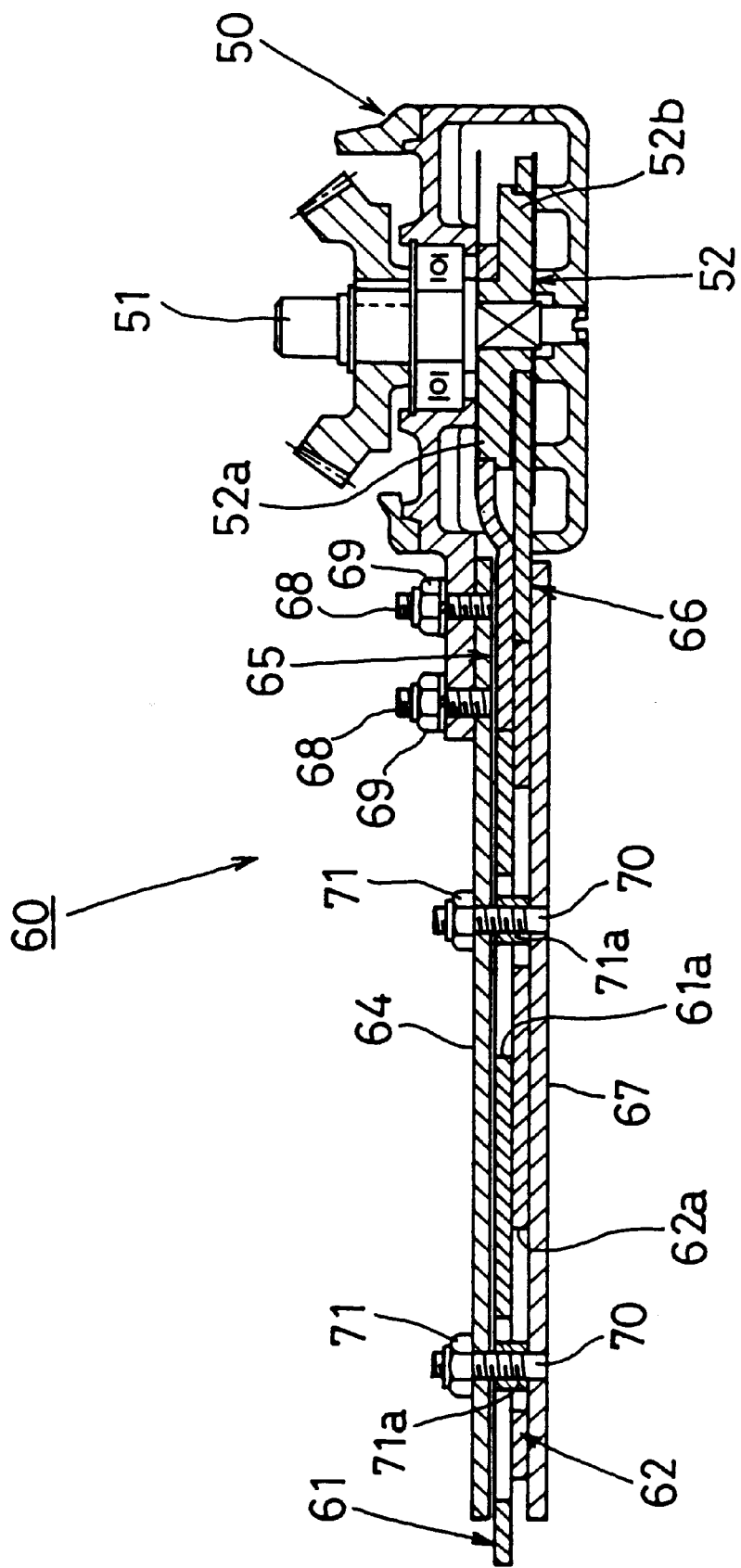
FIG. 4 is a longitudinal cross-sectional view illustrating the clipper blades-mounted working portion and the power transmission device according to the prior art.
Figure 5:
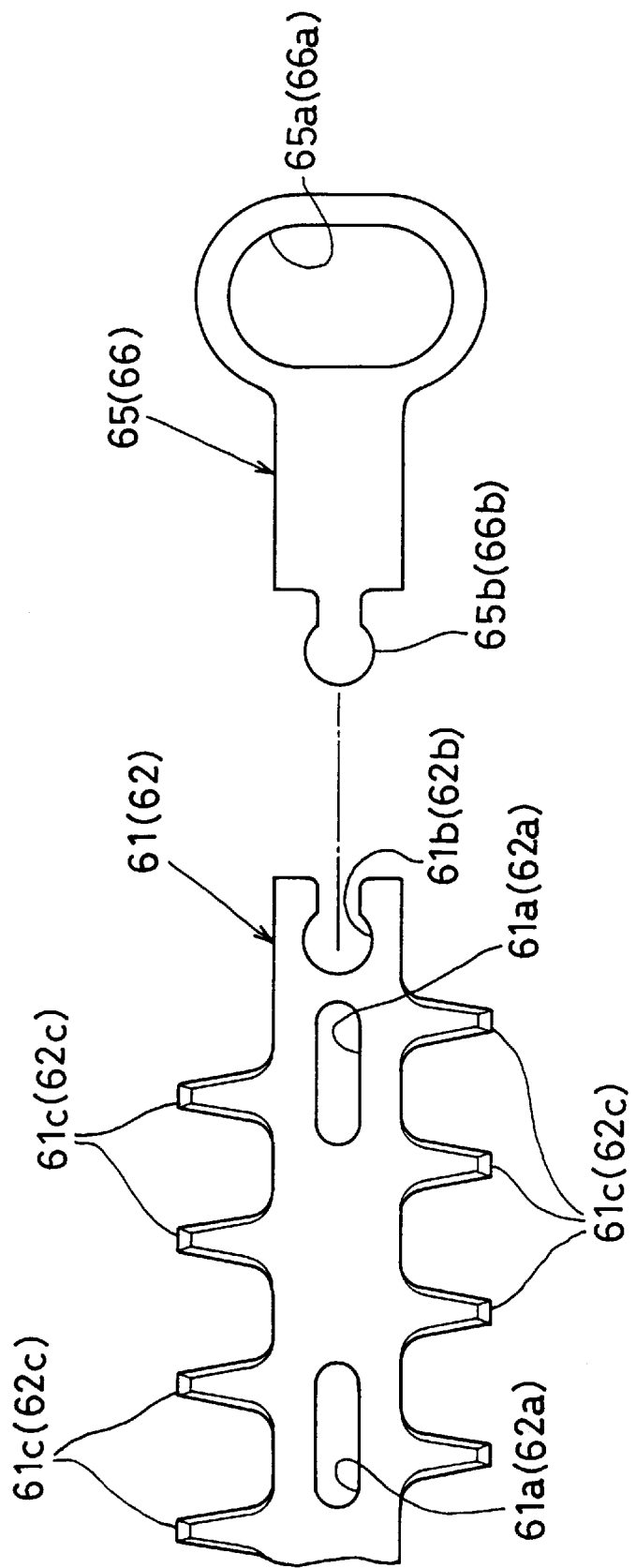
FIG. 5 is an exploded plan view of the clipper blades-mounted working portion and the power transmission device according to the prior art.

As shown in FIGS. 2 and 3, the power transmission device 40 is composed of a main drive shaft 41, a driving rotor 42, a pair of upper and lower plate-like reciprocating movement-guiding arms 44 and 45, and a pair of upper and lower intermediate reciprocating driving plates 46 and 47.

These constituent members are successively interconnected with each other so as to convert the rotational movement of the shaft 41 into reciprocating motion of the clipper blades 21 and 25 of the clipper blade portion 20.

The main drive shaft 41 is rotatably and axially supported in the transmission case 12a of the main body of working machine 10, and is adapted to be driven through a centrifugal clutch (not shown) by a crank shaft (not shown) of the internal combustion engine 11. The driving rotor 42 is disposed adjacent to the main drive shaft 41 and is rotatably mounted on a supporting shaft 43 which is fixed in the transmission case 12a. The outer periphery of the driving rotor 42 is constituted by a large toothed wheel 42c, with which a small toothed wheel 41a formed on the outer periphery of the main drive shaft 41 is engaged. A pair of eccentric circular cams 42a and 42b differing in phase by 180 degrees from each other are formed integrally with the upper and lower surfaces of the driving rotor 42, respectively.

The plate-like reciprocating movement-guiding arms 44 and 45 are provided at the proximal end portions thereof with circular holes 44b and 45b respectively, the inner diameters of which are substantially the same as the outer diameters of the eccentric circular cams 42a and 42b. Also, the plate-like reciprocating movement-guiding arms 44 and 45 are provided at the distal end portions thereof with circular holes 44a and 45a, respectively. The aforementioned pair of intermediate reciprocating driving plates 46 and 47 are provided at the proximal ends thereof with columnar projections 46c and 47c, which are adapted to be engaged with the circular holes 44a and 45a, respectively, of the reciprocating movement-guiding arms 44 and 45. The intermediate reciprocating driving plates 46 and 47 are provided at the distal ends thereof with sagittate coupling portions 46b and 47b, each having a laterally enlarged portion and a round head. Furthermore, the intermediate reciprocating driving plates 46 and 47 are provided with a pair of guiding slots 46a and 47a which are formed in end-to-end relation in the longitudinal direction thereof and which are disposed between the columnar projections 46c and 47c and the tip end of the sagittate coupling portions 46b and 47b, respectively.

Following is a detailed explanation of the clipper blade portion 20. Namely, the clipper blade portion 20 includes a pair of upper and lower clipper blades 21 and 25 superimposed one upon another. These clipper blades 21 and 25 are provided respectively with a multiplicity of triangular cutting edges 22 and 26 formed on both sides and along the longitudinal extent of each clipper blade. Furthermore, a multiplicity of slots 23 and 27 are formed along the full length of each of the clipper blades, the pitch of the slots 23 and 27 being substantially the same as the array pitch of the cutting edges 22 and 26.

An upper blade-supporting plate 30 is arranged on the upper surface of the upper clipper blade 21, and a square lower blade-supporting plate 31a is disposed at the bottom surface of the proximal end portion of the lower clipper blade 25. The upper blade-supporting plate 30 is provided with a plurality of threaded bores 30b at predetermined intervals.

The clipper blades 21 and 25 are supported or carried in a cantilevered manner by the upper blade-supporting plate 30. Specifically, the same number of guiding screws 32 as there are threaded bores 30b in the upper blade-supporting plate 30 are inserted from the bottom side of the lower clipper blade 25 into the slots 27 and 23, and then threaded into the bores 30*b*. Then, the upper portion of each guiding screw 32 that protrudes from the associated threaded bore 30*b* is clamped with a locknut 33, thus firmly clamping the guiding screws 32 to the upper blade-supporting plate 30.

In this case, the clamping of the guiding screws 32 to the upper blade-supporting plate 30 is performed in such a manner that the distance between the head 32*a* of the guiding screws 32 and the upper blade-supporting plate 30 is slightly larger than the total thickness of the pair of the clipper blades 21 and 25. This clamping method is necessary to permit the pair of the upper and lower clipper blades 21 and 25 to slide reciprocatively in the longitudinal direction thereof, such reciprocative movements being guided by the combination of the guiding screws 32 within the slots 23 and 27.

The right end portions (as viewed in FIG. 3) of the pair of clipper blades 21 and 25 as well as the right side portions of the upper and lower blade-supporting plates 30 and 31*a* in FIG. 3 are designed to be mounted on the transmission case 12*a* of the clipper blade portion 20. Specifically, the clipper blades 21 and 25 are provided with cutout engaging portions 21*a* and 25*a* having an inner peripheral shape conforming with the outer peripheral shape of the sagittate coupling portions 46*b* and 47*b* of the pair of intermediate reciprocating driving plates 46 and 47. Since the free end portions 21*a*1 and 25*a*1 of the cutout engaging portions 21*a* and 25*a* are constricted in space therebetween, the enlarged sagittate coupling portions 46*b* and 47*b* are snugly and integrally captured in the cutout engaging portions 21*a* and 25*a*.

The upper blade-supporting plate 30 is provided with two bolt holes 30*a* in vertical alignment with two of the guiding slots 46*a* and 47*a* of the pair of intermediate reciprocating driving plates 46 and 47.

Mounting of the clipper blade portion 20 on the transmission case 12*a* can be performed as follows. Namely, a first fixing bolt 34 is introduced through the square lower blade-supporting plate (a first lower blade-supporting plate) 31*a* from the bottom side thereof, which plate 31*a* is disposed below the lower side of the coupled portion of the lower clipper blade 25 and the intermediate reciprocating driving plate 47 and is provided with a relatively large sliding area for limiting any undesirable dislocation other than the reciprocative motion of the coupled portion. A second bolt 34 is introduced through the bottom side of a circular washer (a second lower blade-supporting plate) 31*b*. The first and second bolts 34 pass through bolt holes in the lower blade-supporting plate 31*a* and the washer 31*b*, and thereafter through the guiding slots 46*a* and 47*a* of the pair of intermediate reciprocating driving plates 46 and 47 as well as through the bolt-holes 30*a* of the upper blade-supporting plate 30, and are further introduced through bolt holes 12*b* in the transmission case 12*a*. The tip end portions of the bolts 34 are then clamped via washers 36 and a locknuts 37. The upper blade-supporting plate 30 and the transmission case 12*a* are thereby firmly and integrally fastened to each other.

Such clamping is accomplished under a condition in which a guide collar 35 is received in each of the guiding slots 46*a* and 47*a* of the pair of intermediate reciprocating driving plates 46 and 47 in surrounding relation to each of the bolts 34. The height of the guide collar 35 is slightly larger than the total thickness of the pair of the upper and lower intermediate reciprocating driving plates 46 and 47 (which is the same as the total thickness of the pair of clipper blades 21 and 25) so as to permit the upper and lower intermediate reciprocating driving plates 46 and 47 and the upper and lower clipper blades 21 and 25 to slide reciprocatively in the opposite directions even though the fixing bolts 34 are firmly clamped with the locknuts 37.

The slots 23 and 27 of the clipper blades 21 and 25 are all the same length, which preferably is that required for the clipper blades 21 and 25 to reciprocatively move with a predetermined stroke. It should be noted that only some of the multiplicity of slots 23 and 27, i.e. only those slots 23 and 27 through which the guiding screws 32 extend, function as guiding slots for the reciprocative movement of the clipper blades 21 and 25.

The reference numeral 12*c* in FIG. 2 denotes a bottom cover which is detachably secured to the bottom portion of the transmission case 12*a* (excluding the bottom portion of the first lower blade-supporting plate 31*a*), so as to prevent any foreign matter from entering into the transmission case 12*a*, etc.

The operation of the hedge trimmer 10 provided with the power transmission device 40 and the clipper blade portion 20 as constructed according to this embodiment will now be explained.

After the clipper blade portion 20, including the clipper blades 21 and 25, is mounted on and secured to the hedge trimmer 10, the recoil starter 16 is pulled to start the internal combustion engine 11. Since the internal combustion engine 11 is initially in an idling state, the engine speed is sufficiently low that the centrifugal clutch (not shown) disposed at the power input side of the power transmission device 40 for actuating the clipper blade portion 20 cannot be put into a state of clutch-in, and hence the driving power of the engine 11 is not transmitted to the clipper blade portion 20 to reciprocate the clipper blades 21 and 25.

Thereafter, the throttle lever 13*a* and the sub-throttle lever 13*b* are manipulated while gripping the rear handle portion 13 and the front handle portion 14 with both hands, so as to increase the output (revolution speed) of the engine 11. As a result, the centrifugal clutch is brought into a state of clutch-in and the main drive shaft 41 is rotated. As the main drive shaft 41 rotates, the driving rotor 42 disposed next to and engaging with the main shaft 41 is caused to rotate. As a result of the rotation of the driving rotor 42, the pair of eccentric circular cams 42*a* and 42*b* (differing in phase by 180 degrees from each other) are caused to eccentrically rotate about the axis of the supporting shaft 43.

Since the eccentric circular cams 42*a* and 42*b* are engaged with the circular holes 44*b* and 45*b* of the reciprocating movement-guiding arms 44 and 45, the rotation of the eccentric circular cams 42*a* and 42*b* causes the arms 44 and 45 to reciprocate. Additionally, since the circular holes 44*a* and 45*a* formed on the distal end portion of the reciprocating movement-guiding arms 44 and 45 are engaged with the columnar projections 46*c* and 47*c* of the intermediate reciprocating driving plates 46 and 47, the intermediate reciprocating driving plates 46 and 47 are likewise driven to reciprocate. The fixing bolts 34 inserted into the guiding slots 46*a* and 47*a* of the intermediate reciprocating driving plates 46 and 47 limit movement of the plates 46 and 47 other than the linear movement in the longitudinal direction thereof. Since the intermediate reciprocating driving plates 46 and 47 are designed to perform a linear reciprocating movement in the longitudinal direction thereof as a result of the locomotive movement of the reciprocating movement-guiding arms 44 and 45 as mentioned above, and additionally, since the pair of eccentric circular cams 42*a* and 42*b* are disposed integral with the driving rotor 42 with their phases differing by 180 degrees from each other, the intermediate reciprocating driving plates 46 and 47 are also caused to move reciprocatively with their phases differing by 180 degrees from each other.

Further, since the pair of intermediate reciprocating driving plates 46 and 47 are snugly and integrally engaged with the clipper blades 21 and 25 through an engagement between the sagittate coupling portions 46b and 47b and the cutout engaging portions 21a and 25a, the clipper blades 21 and 25 also move reciprocatively in opposite directions to each other with a phase shift of 180 degrees, in accordance with the reciprocal movement of the intermediate reciprocating driving plates 46 and 47, thus making it possible to carry out the cutting of vegetation and the like.

When it is desired to remove the clipper blades 21 and 25 in this embodiment for the purpose of exchanging or grinding the blades 21 and 25, the locknuts 33 are loosened and removed from the guiding screws 32, and the guiding screws 32 are then unthreaded from the threaded bores 30b and withdrawn from the upper blade-supporting plate 30 and from the pair of the clipper blades 21 and 25. Further, one of the locknuts 37 (two of which are attached near the transmission case 12a) which is disposed in the vicinity of the clipper blades 21 and 25 is loosened, and the first lower blade-supporting plate 31a is removed together with the fixing bolt 34. Thereafter, the clipper blades 21 and 25 are pulled down from engagement with the intermediate reciprocating driving plates 46 and 47, thereby permitting the easy removal of the clipper blades 21 and 25 from the hedge trimmer 10.

As explained above, according to the hedge trimmer 10 of this embodiment, which is provided with the power transmission device 40 and the clipper blade portion 20, the clipper blades 21 and 25 can be easily removed from the hedge trimmer 10 by first loosening the locknut 37 of the fixing bolt 34 fixing the clipper blade portion 20 to the transmission case 12a, and then by withdrawing the fixing bolt 34 from the transmission case 12a. Therefore, an exchange of clipper blades 21 and 25 can be easily performed without necessitating the disassembly of the transmission case 12a and without risk of damage to either the clipper blades or the other components of the hedge trimmer.

Furthermore, since a pair of intermediate reciprocating driving plates 46 and 47 are couplingly interposed between the pair of reciprocating movement-guiding arms 44 and 45 (to be driven by the driving rotor 42 of the power transmission device 40) and the pair of clipper blades 21 and 25, the reciprocating movement-guiding arms 44 and 45 are allowed to move reciprocatively while being concurrently allowed to move laterally to a slight extent in accordance with the rotation of the driving rotor 42, thus making it possible to form the engaging portion of the driving rotor into a circular shape rather than an oval shape as in the case of the prior art. This minimizes the width in the lateral direction of the reciprocating movement-guiding arms 44 and 45.

Moreover, according to this embodiment, since the intermediate reciprocating driving plates 46 and 47 and the clipper blades 21 and 25 are integrally coupled with each other through the engagement between the sagittate coupling portions 46b and 47b and the cutout engaging portions 21a and 25a (which have an inner peripheral shape conforming with an outer peripheral shape of the sagittate coupling portions 46b and 47b), it is possible to achieve a tight coupling without looseness, so that rattling of the coupled portions is prevented in the reciprocating motions of the intermediate reciprocating driving plates 46 and 47 and the clipper blades 21 and 25.

Furthermore, since the intermediate reciprocating driving plates 46 and 47 and the clipper blades 21 and 25 are integrally coupled with each other so as to form a combined structure which is identical with the conventional clipper blades of integral type, it is possible, if necessary, to exchange this combined plate-blade structure with the conventional integrated type clipper blades.

Additionally, if the coupling portions of the clipper blades 21 and 25, which are to be coupled with the intermediate reciprocating driving plates 46 and 47, are designed in advance to have the same thickness as that of the intermediate reciprocating driving plates 46 and 47, the thickness of the other portions of the blades can be suitably designed in the manufacture thereof in conformity with the end-use thereof.

Although only one example of a power transmission device for the clipper blades of a hedge trimmer has been described in the foregoing explanation, it is also possible to apply the invention to a power transmission device for the clipper blades of other kinds of working machines.

As is apparent from the foregoing explanations, since the clipper blade-mounted power working machine according to this invention is constructed such that a pair of intermediate reciprocating driving plates are couplingly interposed between a pair of reciprocating movement-guiding arms (to be driven by a driving rotor) and a pair of clipper blades, the exchange of the clipper blades can be facilitated and, at the same time, the lateral width of the power transmission device portion can be minimized.

I claim:

1. A power working machine, comprising:
   a rotatable driving rotor;
   a working portion including a pair of clipper blades; and
   a power transmission device for converting the rotational motion of said driving rotor into reciprocating motion of said clipper blades, said power transmission device comprising a pair of reciprocating movement-guiding arms drivingly coupled to said rotor and a pair of intermediate reciprocating driving plates operatively coupled between said pair of reciprocating movement-guiding arms and said pair of clipper blades.

2. The power working machine according to claim 1, wherein said pair of intermediate reciprocating driving plates and said pair of clipper blades are integrally coupled with each other, with reciprocating motion thereof being effected through an engagement between a tapered coupling member formed on one of the intermediate reciprocating driving plates and the clipper blades and a cutout engaging portion formed on the other of the intermediate reciprocating driving plates and the clipper blades, said cutout engaging portion having an inner peripheral shape conforming with an outer peripheral shape of the tapered coupling member.

3. The power working machine according to claim 2, wherein said tapered coupling member is sagittate in shape.

4. The power working machine according to claim 1, wherein said pair of intermediate reciprocating driving plates and said pair of reciprocating movement-guiding arms are coupled with each other through an engagement between a columnar projection formed on either said pair of intermediate reciprocating driving plates or said pair of reciprocating movement-guiding arms and a circular opening formed in the other of said pair of the intermediate reciprocating driving plates or said pair of reciprocating movement-guiding arms.

5. The power working machine according to claim 4, wherein said driving rotor is provided at an upper surface and a lower surface thereof with respective eccentric circular cams, said cams differing in phase by 180 degrees from one another, each of said eccentric circular cams being engaged with a circular hole formed in a respective one of said reciprocating movement-guiding arms, said circular hole having an inner diameter conforming with the outer diameter of said respective eccentric circular cam.

6. The power working machine according to claim 1, wherein said pair of intermediate reciprocating driving plates are provided with guiding slots, said working portion is provided with an upper blade-supporting plate and a lower blade-supporting plate, and said working portion is secured to a main body of the power working machine by means of fixing bolts which are introduced into said guiding slots from the bottom sides thereof to extend upward and sandwich said pair of intermediate reciprocating driving plates and said pair of clipper blades between said upper blade-supporting plate and said lower blade-supporting plate.

* * * * *